V. G. APPLE.
POWER TRANSMISSION DEVICE.
APPLICATION FILED DEC. 26, 1911.

1,039,685.

Patented Oct. 1, 1912.

2 SHEETS—SHEET 1.

V. G. APPLE.
POWER TRANSMISSION DEVICE.
APPLICATION FILED DEC. 26, 1911.

1,039,685.

Patented Oct. 1, 1912.
2 SHEETS—SHEET 2.

Witnesses:
Robert H. Ellis
Mary F. Allen

Inventor:
Vincent G. Apple, by
Dorie Bain May
Attys.

UNITED STATES PATENT OFFICE.

VINCENT G. APPLE, OF DAYTON, OHIO.

POWER-TRANSMISSION DEVICE.

1,039,685. Specification of Letters Patent. Patented Oct. 1, 1912.

Application filed December 26, 1911. Serial No. 667,971.

*To all whom it may concern:*

Be it known that I, VINCENT G. APPLE, a citizen of the United States, residing at Dayton, in the county of Montgomery and State of Ohio, have invented certain new and useful Improvements in Power-Transmission Devices, of which the following is a specification.

My invention relates to improvements in power-transmission devices, and has among its general objects to provide a construction whereby either of two shafts may drive the other, but wherein the speed ratio of the shafts changes accordingly as the one or the other is the driver; to provide novel means for insuring prompt and certain variation of the gearing connections accordingly as either shaft drives the other; and to provide automatic devices for effecting the desired electrical changes.

Figure 1:
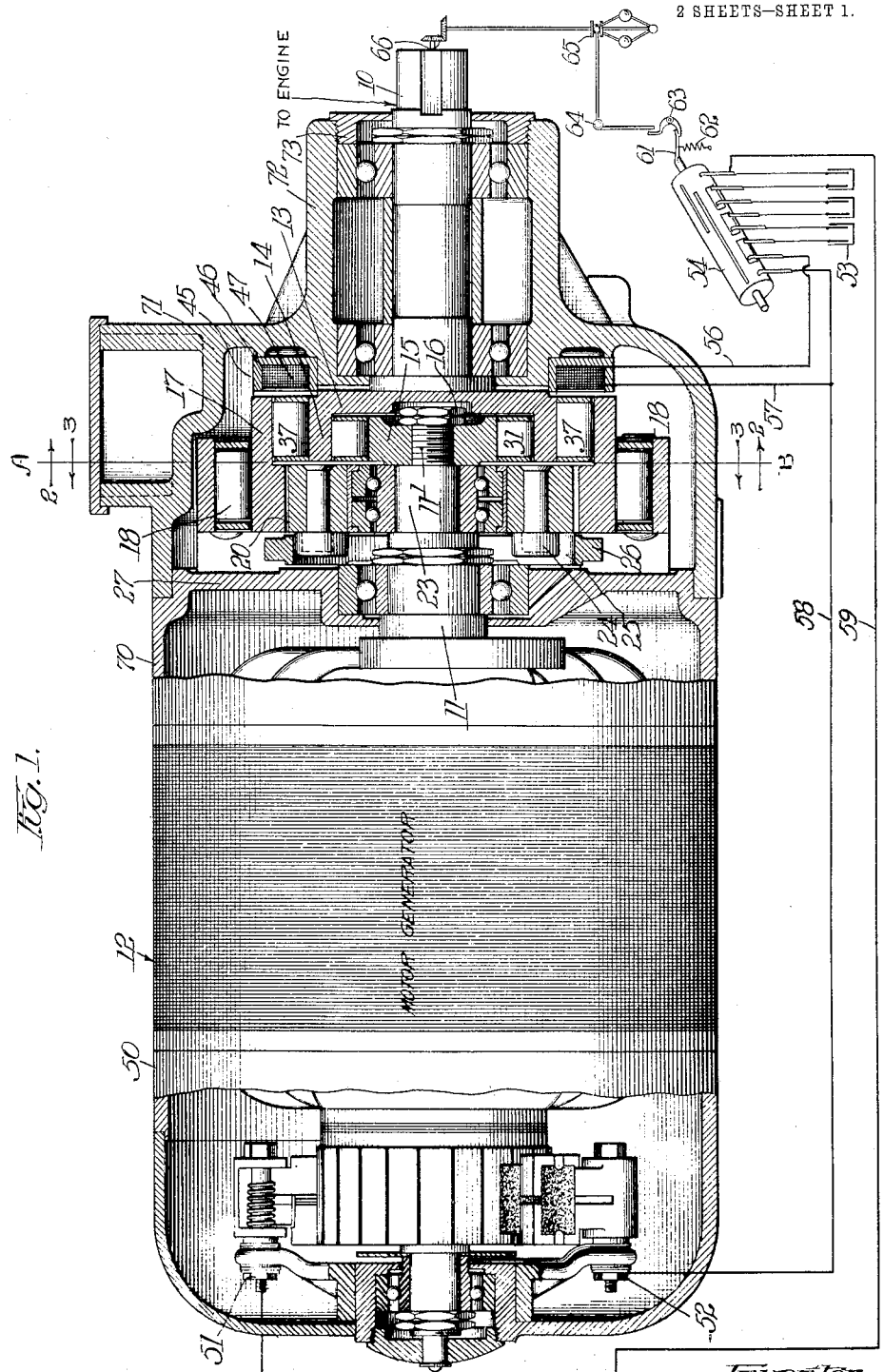
Figure 2:
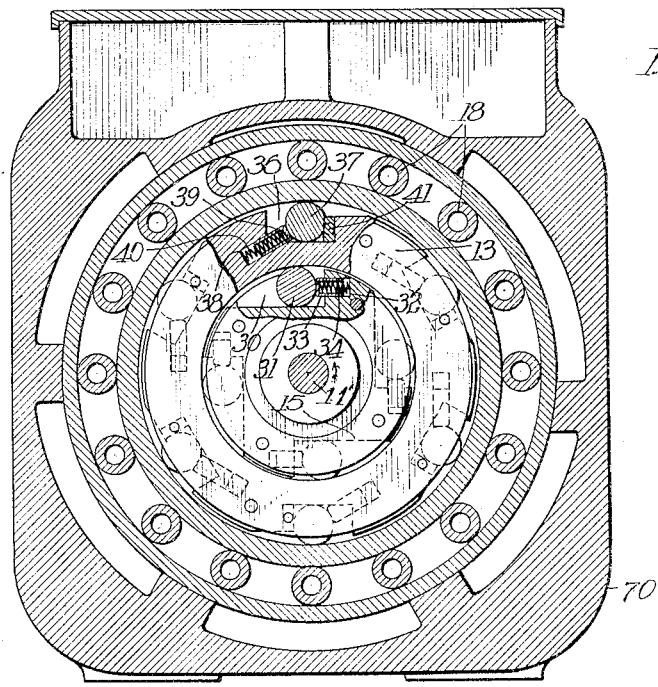
Figure 3:
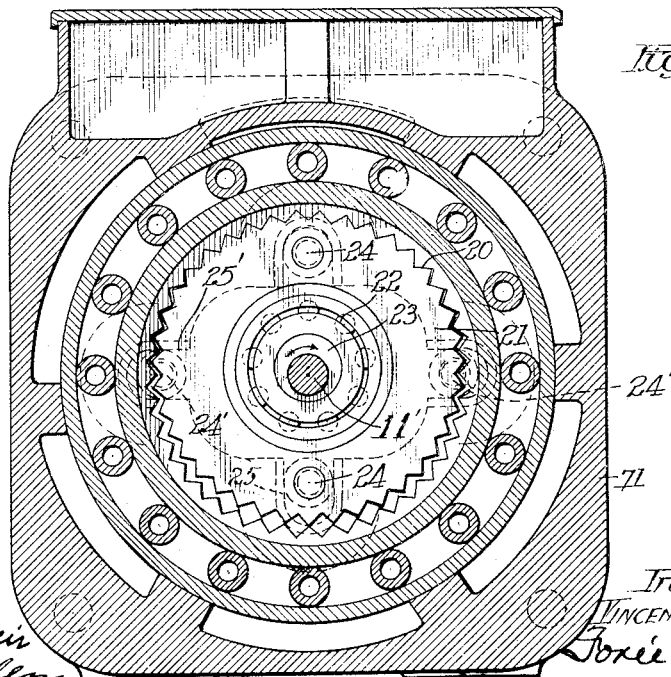

In the drawings, wherein I have illustrated for purposes of disclosure a specific embodiment of my invention, employing my invention as a means for effecting connection between an engine shaft and the shaft of an electric motor-generator, Figure 1 is a central vertical section through the gearing with parts of the dynamo in elevation and electrical connections diagrammatically shown; Fig. 2 is a transverse section on line A—B of Fig. 1, looking in the direction of the arrows 2—2; and Fig. 3 is a section on the same line looking in the direction of the arrows 3—3.

In the drawings 10 and 11 indicate two shafts of which I will term the shaft 10 the engine shaft, and shaft 11 the dynamo shaft.

A motor-generator 12 and engine may often be employed to mutual advantage in arrangement whereby the motor shaft may drive the engine shaft 10 (as in starting a gas engine) or the engine shaft 10 may drive the generator shaft 11 (as in generating current for utilization in ignition and the like). While I do not restrict the application of my invention to the use illustratively shown, the drawings indicate a structure especially adapted for connection of an automobile lighting and starting dynamo to the shaft of an automobile engine, and I will therefore describe such specific application in some detail.

The engine shaft 10 carries an intermediate clutch element 13, having an annular overhanging ring 14 as a salient portion. An extremity 11' of the dynamo shaft carries an inner clutch element 15, threaded thereon and retained by lock nuts 16. Peripherally around the intermediate clutch element 13 lies an outer clutch element 17, driven in rotation from the dynamo shaft 11 at a much slower rate of rotation than that of the shaft itself. To this end, the outer clutch annulus 17 is mounted in an annular roller bearing structure 18 of any suitable construction and is geared to the dynamo shaft 11 by a suitable reduction gear driving said outer element in the same direction as the inner clutch element but at a different rate of rotation, which in this case is much lower than that of the shaft. Specifically, the outer element 17 extends laterally toward the dynamo across the plane indicated by line A—B,—which may for convenience be regarded as the division plane between the clutch portion of the apparatus and the reduction gear portion thereof,—and this lateral extension of the outer clutch element, as indicated in Fig. 3 is formed into an internal gear 20. Within this internal gear 20 is a generally similar gear 21 of slightly smaller diameter, and having a smaller number of teeth than the gear 20, the construction shown providing 40 teeth on the gear 20 to 39 on the gear 21. This inner gear 21 is mounted through a suitable ball bearing structure 22 on an eccentric 23 upon the dynamo shaft 11, so that the inner gear 21 may be universally moved bodily in its plane, but not rotated by the rotation of the dynamo shaft 11. To maintain the gear 21 against rotation, while leaving it free to move universally, said gear 21 is provided on its inner side with projecting rollers 24 engaging in vertical slots 25—25 in a yoke member 26 which is arranged in proximity to a stationary casing wall 27 and which has also transverse slots 25' engaging roller studs 24' projecting from the fixed wall 27.

It will be apparent that as the shaft 11 is rotated in the direction indicated by the arrows in Figs. 2 and 3, the bodily movement,—which I term vibration,—of the gear 21 in its plane effects a rotary displacement of the clutch element 17 in the same direction that the shaft rotates, but at a greatly reduced speed, in this instance at the ratio of one to forty.

To provide for the engagement of the intermediate clutch element with either the inner element 15 or the outer element 17 I provide rolling wedge clutch parts interposed between the rotatable elements and carried thereby. Thus the element 15 has peripheral tapering pockets 30 decreasing in size in a forward direction, that is, the direction of rotation, to receive rollers 31 of appropriate size to coact with the smooth confronting surface of element 14 either to clutch the inner and intermediate members together when in the narrower portion of the pocket, or to free said members for relative rotation when in the wider portion of the pocket. Preferably, further, I provide at the deeper end of each pocket a recess 32 in which is slidably mounted a thimble 33 projected outwardly by a spring 34, thereby to tend normally to hold the rollers in the shallower portion of their pockets. Similarly, I provide in the periphery of the intermediate clutch element 14 pockets 36, tapering forwardly in the same direction as pockets 30 and containing the rollers 37 movable to wedge against or to release the smooth inner surface of the exterior clutch member 17. Preferably a recess 38 is made at the front or shallower end of the pocket to receive a thimble 39 pressed forward by spring 40 so as normally to hold the roller at the deeper rear end of the pocket, the rear extremity of the pocket being preferably faced with a strip 41 of non-magnetic material such as brass.

It will be obvious that, in the absence of the spring structures 34 and 40 affecting the rollers 31 and 37, when shaft 11 is rotated as a driver with shaft 10 standing still the rollers 31 of the inner set would roll to the deeper ends of their pockets, while the rollers 37 of the outer set would be rolled by the slowly rotating outer clutch element 17 to the shallow ends of their pockets, thereby to clutch the shaft 10 to the slowly rotating clutch element 17, so that shaft 11 drives said shaft 10 through the reduction gear. The springs 34 and 40, acting oppositely on the inner and outer sets of rollers, tend to prevent the said movements of both said sets of rollers. When the shaft 10 is turned as the driver, shaft 11 standing still, inner rollers 31 tend to roll to the shallower portion of their pockets to exert a clutch action and rollers 37 tend to roll to the deeper ends of their pockets to effect a releasing action. The springs aid these movements. Therefore, it will be seen, the double clutch is capable of automatically effecting connection from shaft 10 to shaft 11 by direct clutch action, and of effecting connection from shaft 11 to shaft 10 through the reduction gear, the connection first mentioned being assisted by the springs for the inner set of rollers and the connection last mentioned being impeded by the springs for the outer set of rollers.

The action of the springs 40 will normally prevent clutch engagement taking place between the intermediate and outer clutch members, but in order that the clutch-preventing or disabling action of the springs 40 may be overcome and positive clutch action insured at will, I form the rollers 37 of magnetically susceptible material, and associate with them an electromagnet in such fashion that through the effect of the electromagnet the magnetically susceptible rollers will respond to movement of the outer clutch member 17 to overcome the spring resistance and effect its functional wedge action between the elements 17 and 13. To this end, I provide an electromagnet 45 comprising an annular yoke 46 having wound in its annular channel a winding 47, the legs of the yoke being arranged to span the annular path of travel of the magnetic rollers 37 with the annular polar extremities of the yoke confronting respectively the proximate edges of the intermediate clutch element 14 and the outer clutch element 17. Now, it will be apparent that the rollers 37 lie within the field of force of the magnet 45 when the latter is energized and form, with the proximate portions of the clutch elements 17 and 14, a path for the magnetic lines of force. Thus, assuming the shaft 10 to be initially at rest, the shaft 11 to be in rotation, and the magnet 45 to be energized, the rotation of the clutch element 17 relative to the clutch element 13 and the rollers 37 produces a magnetic drag on the magnetically susceptible rollers 37 interposed between said two magnetized parts to force said rollers forward overcoming the tension of the light springs 40 and effectuating the clutch engagement between the outer clutch member 17 and the intermediate clutch member 14.

Obviously the control of the electromagnet might be effected in many ways, but for some purposes,—as for instance in the suggested use of the electric dynamo as the starting motor for an automobile gas engine, and also as the charging dynamo for the storage batteries,—it is advantageous to energize the magnet as long as the dynamo is operated as a driving motor, slowly to drive the shaft 10, and automatically to deënergize the magnet as soon as the shaft 10 begins its rapid engine-driven rotation. An arrangement to this end,—being merely an illustrative selection from many ways of attaining the result sought,—is diagrammatically shown in Fig. 1, wherein 51 and 52 indicate the brush terminals of dynamo 12, and 53 indicates the set of storage batteries,—say three six-volt cells,—arranged for series connection in circuit with the dynamo and with the magnet 45 all for parallel connection in circuit with the dynamo to the exclusion of the magnet 45.

54 indicates a drum switch movable to two positions with respect to a series of contact fingers or brushes which comprise, say, six alternatingly long and short brushes for the opposite poles of the respective cells, and an additional pair of long and short brushes, the long extra brush connected by wire 56 through the magnet 45, and by wire 57 to wire 58 which connects the short extra switch finger at one terminal of the dynamo, the other terminal 51 whereof is connected by wire 59 to an appropriate end long contact. The drum 54 bears contact strips obviously disposed for coaction with the brushes, so that in the position shown the batteries are connected in series with each other and with the magnet coil and dynamo thereby to energize the magnet coil and drive the dynamo as a motor. When the drum is moved by its spring, the remaining contacts on the drum connect together all of the short brushes shown and connect together (independently of the short brushes, of course) the long brushes for the several batteries, but to the exclusion of the long brush at the end of wire 56, thereby to throw the batteries in parallel in a dynamo-supplied circuit, opening the circuit for the magnet 45. As indicative of the fact that the switch operation may be automatic, I show the drum 74 as provided with a lever arm 61 acted upon by spring 62 retained in raised position by latch 63 which may be moved to unlatching position by bell-crank lever 64 acted upon by a governor 65 driven from the engine shaft 10 through the gear 66. Manifestly, with the arrangement illustratively shown, as long as the electrical parts are in the positions indicated, the storage batteries drive the dynamo as a motor and highly energize the magnet 45, thereby potentiating the outer clutch for operation, so that the motor may drive the engine shaft 10 through the reduction gear. As soon as the engine "picks up" and begins to rotate its shaft at a higher rate of speed, the governor 65 causes the release of latch 63 allowing the drum to turn under the influence of spring 62 thereby to change the circuit relation to connect the batteries in parallel relation to each other in the generator circuit and to deënergize the magnet 45. Thereupon the inner clutch works, connecting the dynamo for rotation by the engine shaft, and the outer clutch disengages.

While my invention may be variously embodied, the mechanical construction shown is one which I find advantageous in an automobile-starting and electrifying system, and in such arrangement I embody the clutch and reduction gear in the structure of the dynamo casing, 70, which affords suitable bearings for the shaft 11, and such casing 70 has an extension 71 forming a closed housing for the reduction gear and clutch, said end housing 71 having a hub extension 72 receiving two roller bearings for adequate guiding support of the shaft 10 and supporting on its inner projecting end the magnet 45. The extremity of the hub 72 may be substantially closed by a screw cap 73, so that the entire mechanism is housed within the dynamo casing and completely protected.

Having thus described a specific embodiment of my invention for purposes of full disclosure, but without intent thereby to limit the invention further than is specified in the claims, what I claim is:

1. Power transmission means comprising two rotatable elements to be connected, positive clutch parts of magnetically susceptible material carried by one element thereof and movable positively to engage or to disengage the other element, and means to create a magnetic field relative to which the rotatable elements and said clutch parts form a path for magnetic flux, to cause the magnetic drag incident to movement of one of the clutch elements relative to the other to tend to move the positive clutch parts to one predetermined position.

2. Power transmission means comprising two rotatable elements to be connected, rolling wedge clutch parts of magnetically susceptible material interposed between said two rotatable elements, and means to create a magnetic field including therein a magnetic clutch part, thereby to influence the action of said clutch part, in response to rotation of one of said rotatable elements.

3. Power transmission means comprising two rotatable elements to be connected, rolling wedge clutch parts of magnetically susceptible material interposed between said rotatable elements and normally disengaging them, and means to create a magnetic field including therein the magnetically susceptible clutch parts, appropriate to cause said clutch parts as a result of magnetic drag incident to rotation of one of said rotatable elements to effect rolling wedge engagement between said elements.

4. In a power transmission device, the combination of three rotatable elements concentrically disposed, rolling wedge clutch parts interposed between said three elements to cause the intermediate member to be driven by one of the opposed elements and to drive the other of the opposed elements.

5. In a power transmission device, the combination of three concentric clutch elements all rotatable in the same direction, and rolling wedge clutch parts interposed between the intermediate element and both of the opposed elements to cause said intermediate element to be driven from one of said opposing elements and to drive the other of said opposing elements.

6. In a power transmission device, the combination of three concentric clutch elements, means to drive the inner and outer clutch elements at different rates of speed, and rolling wedge clutch parts interposed between the intermediate element and both of the opposed elements to cause said intermediate element to drive one of said opposed elements and to be driven from the other of said opposed elements.

7. In a power transmission device, the combination of three concentric clutch elements, a reduction gear interposed between the inner clutch element and outer clutch element to cause them to rotate at different rates of speed and rolling wedge clutch parts interposed between the intermediate clutch element and both of the opposed elements to cause said intermediate element to be driven from one of said opposed elements and to drive the other of said opposed elements.

8. In a power transmission device, the combination of two shafts, an intermediate clutch element on one of said shafts, an inner clutch element on the other of said shafts, an outer clutch element, said clutch elements being concentrically arranged, a reduction gear between the inner clutch element and the outer clutch element, and rolling wedge clutch parts interposed between the intermediate element and both of the opposed elements arranged to transmit power through the intermediate clutch element to the inner clutch element and through the outer clutch element to the intermediate clutch element, whereby the reduction gear is interposed between the shafts when one shaft drives the other, but is not interposed between the shafts when the driving relation is reversed.

9. The combination with a dynamo having a casing and a shaft, of a second shaft supported in the casing in alinement with the first, an intermediate clutch member on said second shaft, an inner concentric clutch member on the dynamo shaft, an outer concentric clutch member, reduction gears between the inner clutch member and the outer clutch member, said clutch members and reduction gear being contained in the casing, and rolling wedge clutch parts between the intermediate clutch member and both the opposed clutch elements for connecting the intermediate clutch member with either the inner or the outer clutch element.

10. In a power transmission device, the combination of two relatively rotatable members, rolling wedge clutch means interposed therebetween, means normally positively to disable said clutch means, and electromagnetic means to influence said clutch means to overcome said disabling means.

11. In a power transmission device, the combination of two rotatable elements, rolling wedge clutch means interposed therebetween, an electromagnet including in its field a magnetic path through the rotatable elements and clutch means to influence the action of said rolling clutch means in response to rotation of one of the elements, a circuit for said magnet, and means for automatically opening said circuit.

12. In a power transmission device, the combination of two shafts, an intermediate clutch element on one of said shafts, an inner clutch element on the other shaft, an outer clutch element driven at reduced speed from the second shaft, rolling wedge clutch means between said clutch elements, means to cause said second shaft to drive the first through the slowly rotating outer clutch member and means to cause the first said shaft to drive the second shaft through the inner clutch member.

In testimony whereof I hereunto set my hand in the presence of two witnesses.

VINCENT G. APPLE.

In the presence of—
E. M. EARNHART,
N. E. SNYDER.